United States Patent [19]
Schneider et al.

[11] Patent Number: 5,820,228
[45] Date of Patent: Oct. 13, 1998

[54] MAGNET VALVE BLOCK FOR A VEHICLE BRAKE SYSTEM

[75] Inventors: Norbert Schneider, Tiefenbronn; Eberhard Schaffert, Leonberg; Friedbert Roether, Cleebronn, all of Germany

[73] Assignee: Robert Bosch GmbH, Stuttgart, Germany

[21] Appl. No.: 928,970

[22] Filed: Sep. 12, 1997

Related U.S. Application Data

[63] Continuation of Ser. No. 692,150, Aug. 5, 1996, abandoned.

[30] Foreign Application Priority Data

Aug. 5, 1995 [DE] Germany ............... 195 28 812.2

[51] Int. Cl.$^6$ ............... B60T 8/32; F15B 13/08
[52] U.S. Cl. ............ 303/119.3; 137/884; 303/DIG. 10
[58] Field of Search ............... 303/119.2, 113.1, 303/116.4, DIG. 10, 119.3; 137/596.13, 884

[56] References Cited

U.S. PATENT DOCUMENTS

| | | | |
|---|---|---|---|
| 4,705,324 | 11/1987 | Kervagoret | 303/119.2 |
| 4,929,038 | 5/1990 | Reinartz et al. | 303/119.2 |
| 5,462,344 | 10/1995 | Jakob et al. | 303/119.2 |

FOREIGN PATENT DOCUMENTS

| | | |
|---|---|---|
| 0373551 | 6/1990 | European Pat. Off. . |
| 406115420 | 4/1994 | Japan . |
| 2276273 | 9/1994 | United Kingdom . |

*Primary Examiner*—Matthew C. Graham
*Attorney, Agent, or Firm*—Edwin E. Greigg; Ronald E. Greigg

[57] ABSTRACT

The invention relates to a unit for a pneumatic brake system for a utility vehicle, which has a valve block into which magnet valves are inserted. To secure the magnet valves on the valve block, the unit includes a retaining plate which is secured to the valve block and which has spring elements integral with it the retaining plate presses the magnet valves into valve receptacles of the valve block. The unit has the advantage that the retaining plate balances out tolerances in the manufacture of the valve block and the production of the magnet valves. In a further feature, the unit mounts pressure sensors on the valve block in a same manner as the magnet valves.

20 Claims, 2 Drawing Sheets

MAGNET VALVE BLOCK FOR A VEHICLE BRAKE SYSTEM

This application is a continuation, of application Ser. No. 08/1692,150, filed Aug. 5, 1996, now abandoned.

BACKGROUND OF THE INVENTION

The invention is based on a hydraulic unit for a for a pneumatic brake system for a utility vehicle.

One such unit is known from European Patent Disclosure EP 0 373 551 A2. The known unit has a valve block into which magnet valves are inserted. A rigid retaining plate secured to the valve block fits over an annular shoulder and in this way retains the magnet valves on the valve block.

The magnet valves are inserted into valve receptacles of the valve block into which fluid supply and drainage conduits discharge. To assure that the magnet valve will, as intended, be seated in the valve receptacle, sealed off from the outside, and that a valve inlet will communicate with the fluid supply conduit and a valve outlet will communicate with the fluid drainage conduit, the magnet valve and the valve receptacle in the valve block must be precision-manufactured to close tolerances, so that yet there will be no communication between these conduits that bypasses the magnet valve. The magnet valve switching time would also become longer unless the magnet valve is seated as deeply in the valve receptacle as intended.

OBJECT AND SUMMARY OF THE INVENTION

In the unit according to the invention, the magnet valves are pressed against the valve block by spring elements. The spring elements are integral with a retaining plate that is mounted on the valve block. This has the advantage that even comparatively wide production tolerances for the magnet valves and valve block can be evened out, and the intended seating of the magnet valves on the valve block is assured. Another advantage is the simplicity of mounting the magnet valves on the valve block, with one retaining plate for all the magnet valves. This mounting can be accomplished quickly, and is well-suited to being automated. Because the retaining plate is integral with the spring elements, individual fasteners cannot be forgotten or inserted incorrectly.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
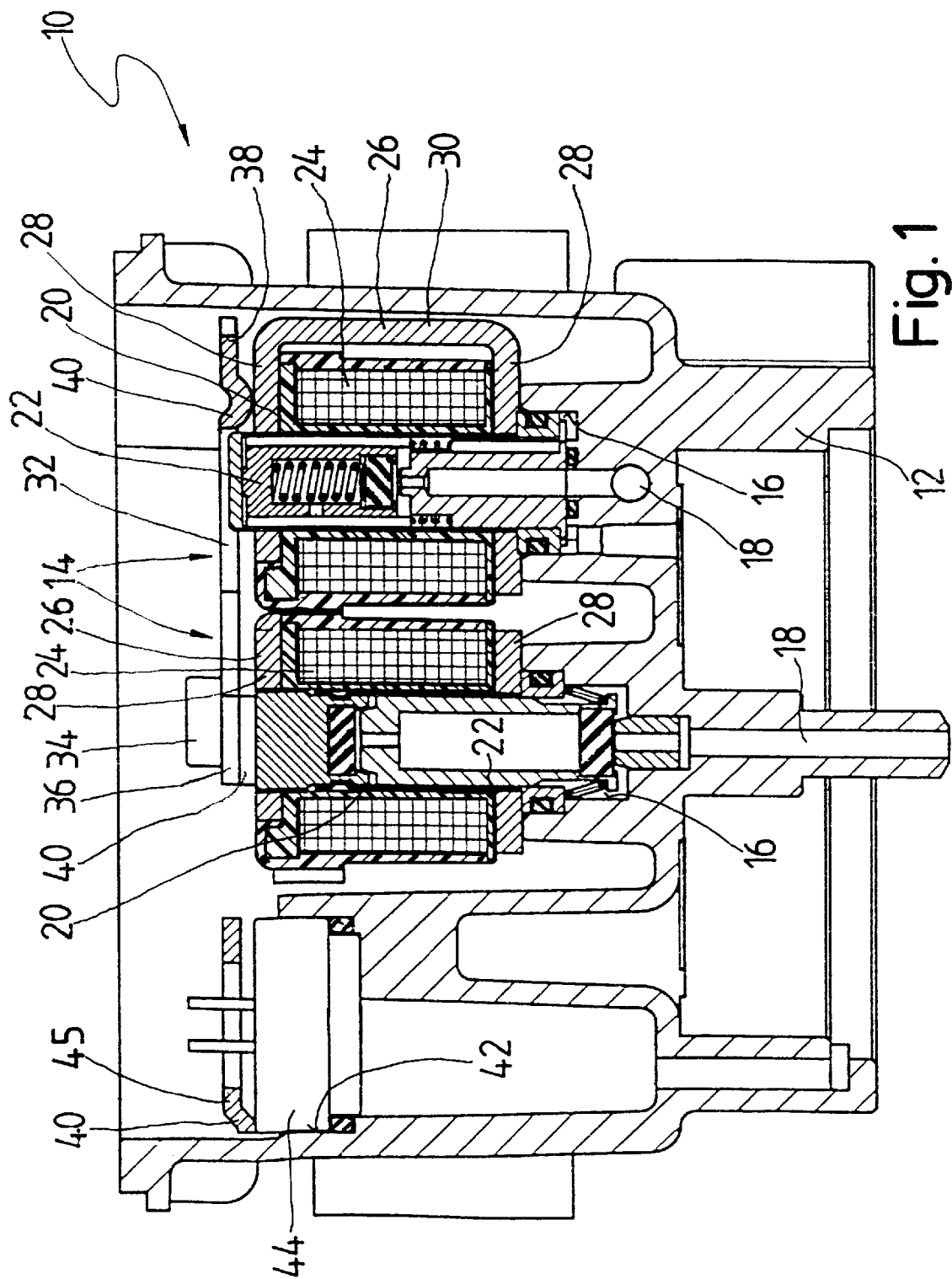
FIG. 1 is a section through a unit according to the invention, taken along the line I—I of FIG. 2.

The unit 10 according to the invention, shown in FIG. 1, is intended for a pneumatic brake system of a utility vehicle. It has a valve block 12, into which a total of six magnet valves 14 are inserted, only two of which are visible in the drawing. The magnet valves are inserted into bores in the valve block 12 which serve as valve receptacles and into which fluid conduits 18 of the valve block 12 discharge.

Figure 2:
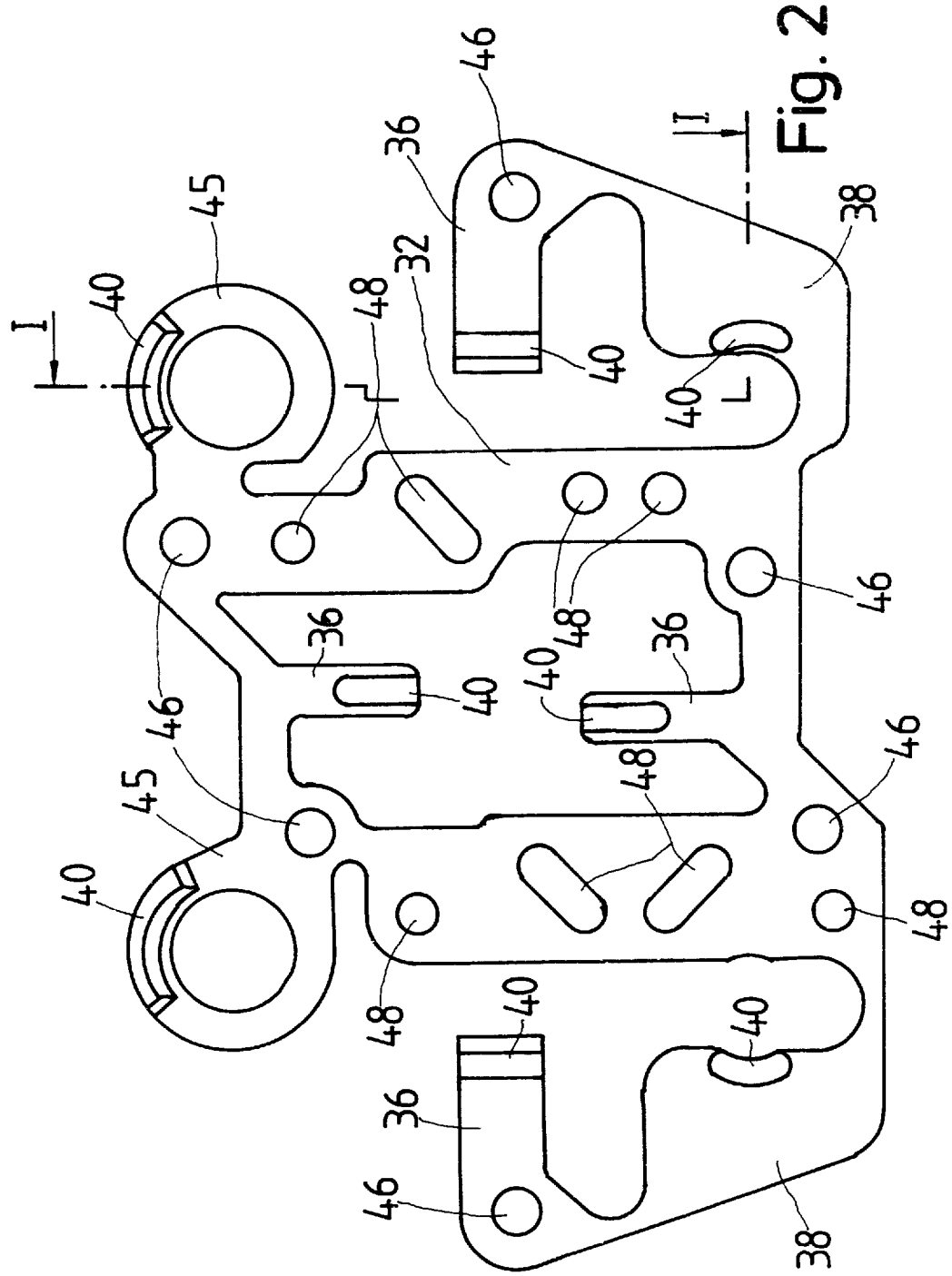
FIG. 2 shows a view from below of a retaining plate of the unit of FIG. 1 on a smaller scale.

The magnet valves 14 have a valve dome 20 of nonmagnetic material, in which an axially displaceable armature 22 is received. An electrically wound coil 24 for actuating the magnet valve 14 is slipped onto the valve dome 20 of each magnet valve 14. The magnet valves have a C-shaped magnet yoke 26, both legs 28 of which are joined to the valve dome 20 at face ends of the coils 24. A yoke head 30 extends axially parallel to the magnet valve 14 along the circumference of the coil 24 in the section in FIG. 1 that is bent by 90° from the longitudinal axis of the magnet valve 14 shown on the right in FIG. 1—see FIG. 2—the yoke head 30 of this magnet valve 14 is visible, but the yoke head of the magnet valve 14 shown on the left in FIG. 1 is located behind the coil 24 in FIG. 1 and is therefore not visible. Since magnet valves are known per se in many variant forms, there is no need here to describe details of them or their function.

To secure the magnet valves 14 in the valve receptacles 16 of the valve block 12, a retaining plate 32 (FIG. 2) is screwed to the valve block 12 with a total of six screws 34. The retaining plate 32 is located on a face end of the magnet valves 14 that is remote from the valve block 12.

The retaining plate 32 is a stamped sheet-metal part. It has integral spring elements 36, 38, in the form of spring tongues 36 that are free on one end and spring bridges 38 that merge integrally with the retaining plate 32 on both ends. Short beads 40 are formed on the spring elements 36, 38, with which the spring elements 36, 38 press against the magnet valves 14 and thus retain them in their intended location in the valve receptacles 16 of the valve block 12. In this way, tolerances in the production of the valve block 12 with the valve receptacles 16 and in the manufacture of the magnet valves 14 are balanced out. Lengthening of the switching times of the magnet valves 14 caused by lifting of the magnet valves 14 from the valve receptacles 16 upon imposition of pressure or by displacement of the coils 24 relative to the valve dome 20 is thus precluded.

The bead 40 effects a defined contact point of the spring element 36, 38 on the magnet valve 14, regardless of the spacing of the yoke leg 28 of the magnet valve 14 against which the spring element 36, 38 presses from the valve block 12, which can vary because of tolerances from one magnet valve 14 to another and thus can bring about a variable elastic deformation of the spring elements 36, 38. Between the longitudinal axis of the magnet valve 14 and the yoke head 30, the bead 40 presses eccentrically against the yoke leg 28 that is next to the retaining plate 32. Because of the eccentric disposition of the bead 40, some of the force of the spring element 36 is transmitted via the yoke head 30 to the second yoke leg 28; that is, the force is transmitted to the valve dome 20 having been distributed via both yoke legs 28, and in particular the coil 24 is not stressed by the force of the spring element 36.

The bead 40 on each of the spring elements 36, 38 also defines the effective length of the spring element 36, 38 to the next fastening point (screw 34), which codetermines the spring stiffness or spring rate. To limit a tilting moment on the magnet valves 14, the bead 40 is located radially near the valve dome 20.

Two pressure sensors 44 (only one of which is visible in FIG. 1) are inserted into two sensor receptacles 42 of the valve block 12. The sides of the pressure sensors 44 remote from the valve block 12 are approximately flush with the sides of the magnet valves 14 remote from the valve block 12. Like the magnet valves 14, the pressure sensors 44 are retained in the sensor receptacles 42 by spring elements 45, which have beads 40 and are integral with the retaining plate. The spring elements 45 for the pressure sensors 44 are embodied as circular rings, which at one point on the circumference merge integrally with the retaining plate 32.

The retaining plate 32 is provided with six screw bores 46 for the screws 34 to be passed through. It has holes 48 in the form of round and oblong slots through which connecting wires, not shown, for the magnet valves 14 and pressure sensors 44 can be inserted.

The foregoing relates to a preferred exemplary embodiment of the invention, it being understood that other variants and embodiments thereof are possible within the spirit and scope of the invention, the latter being defined by the appended claims.

What is claimed and desired to be secured: by Letters Patent of the United States is:

1. A magnet valve block for a vehicle brake system, comprising a valve block with fluid conduits into which magnet valves are inserted, each magnet valve (14) is formed by a component unit which comprises a valve dome (20), an armature (22) is displaceable in said valve dome, a coil (24) is slipped onto and surrounds the valve dome (20), said coil (24) includes opposite face ends and includes a C-shaped magnet yoke (26), said magnet yoke (26) includes two legs (28), each of said two legs are joined to the valve dome (20) at said opposite face ends of the coil (24); a retaining plate (32) which is mounted on the valve block and retains the magnet valves in the valve block, the retaining plate (32) includes spring elements (36, 38) that are integral with the retaining plate and that engages one of the yoke legs (28) remote from a blind bore in the valve block (12), the blind bore acts as a valve receptacle (16); the spring elements engage the magnet valves (14) and press the magnet valves against a bottom surface of the blind bore in the valve block (12), the spring force of the spring elements (36, 38) is transmitted to the valve dome (20) via both legs (28) of the magnet yoke (26).

2. A magnet valve block in accordance with claim 1, in which the spring elements (36, 38) of the retaining plate (32) press the magnet valves (14) in an axial direction into valve receptacles (16) of the valve block (12), into which receptacles fluid conduits (18) discharge.

3. A magnet valve block in accordance with claim 1, in which the retaining plate (32) is a stamped sheet-metal part.

4. A magnet valve block in accordance with claim 2, in which the retaining plate (32) is a stamped sheet-metal part.

5. A magnet valve block in accordance with claim 3, in which the spring elements (36, 38) of the retaining plate (32) have protuberances (40), by which the protuberances press against the magnet valves (14).

6. A magnet valve block in accordance with claim 4, in which the spring elements (36, 38) of the retaining plate (32) have protuberances (40), by which the protuberances press against the magnet valves (14).

7. A magnet valve block in accordance with claim 1, in which the spring elements (36, 38) of the retaining plate (32) press against the magnet yoke (26) of the magnet valves (14), said magnet yoke is joined to the valve dome (20), in which the armature (22) is axially displaceably supported, and the magnet yoke surrounds the valve dome (20) and fits around the coil (24).

8. A magnet valve block in accordance with claim 2, in which the spring elements (36, 38) of the retaining plate (32) press against the magnet yoke (26) of the magnet valves (14), said magnet yoke is joined to the valve dome (20), in which the armature (22) is axially displaceably supported, and the yoke surrounds the valve dome (20) and fits around the coil (24).

9. A magnet valve block in accordance with claim 3, in which the spring elements (36, 38) of the retaining plate (32) press against the magnet yoke (26) of the magnet valves (14), said magnet yoke is joined to the valve dome (20), in which the armature (22) is axially displaceably supported, and the yoke surrounds the valve dome (20) and fits around the coil (24).

10. A magnet valve block in accordance with claim 4, in which the spring elements (36, 38) of the retaining plate (32) press against the magnet yoke (26) of the magnet valves (14), said magnet yoke is joined to the valve dome (20), in which the armature (22) is axially displaceably supported, and the yoke surrounds the valve dome (20) and fits around the coil (24).

11. A magnet valve block in accordance with claim 5, in which the spring elements (36, 38) of the retaining plate (32) press against the magnet yoke (26) of the magnet valves (14), said magnet yoke is joined to the valve dome (20), in which the armature (22) is axially displaceably supported, and the yoke that surrounds the valve dome (20) and fits around the coil (24).

12. A magnet valve block in accordance with claim 6, in which the spring elements (36, 38) of the retaining plate (32) press against the magnet yoke (26) of the magnet valves (14), said magnet yoke is joined to the valve dome (20), in which the armature (22) is axially displaceably supported, and the yoke that surrounds the valve dome (20) fits around the coil (24).

13. A magnet valve block in accordance with claim 7, in which a yoke head (30) of the magnet yoke (26) is disposed extending approximately axially parallel to the circumference of the coil (24).

14. A magnet valve block in accordance with claim 2, in which a yoke head (30) of the magnet yoke (26) is disposed extending approximately axially parallel to the circumference of the coil (24).

15. A magnet valve block in accordance with claim 3, in which a yoke head (30) of the magnet yoke (26) is disposed extending approximately axially parallel to the circumference of the coil (24).

16. A magnet valve block in accordance with claim 13, in which the spring elements (36) of the retaining plate (32) press eccentrically against the yoke legs (28), of the magnet yoke (26) of the magnet valves (14), that is remote from the valve block (12).

17. A magnet valve block in accordance with claim 1, in which at least one pressure sensor (44) is inserted into the valve block (12) and is pressed against the valve block (12) by a spring element (45) that is integral with the retaining plate (32).

18. A magnet valve block in accordance with claim 2, in which at least one pressure sensor (44) is inserted into the valve block (12) and is pressed against the valve block (12) by a spring element (45) that is integral with the retaining plate (32).

19. A magnet valve block in accordance with claim 3, in which at least one pressure sensor (44) is inserted into the valve block (12) and is pressed against the valve block (12) by a spring element (45) that is integral with the retaining plate (32).

20. A magnet valve block in accordance with claim 17, in which the pressure sensor (44) is inserted into a sensor receptacle (42) of the valve block (12), into which receptacle a fluid conduit discharges and into which the spring element (36) presses the pressure sensor.

* * * * *